US012025584B2

(12) United States Patent
Hamano (10) Patent No.: US 12,025,584 B2
(45) Date of Patent: Jul. 2, 2024

(54) ULTRASONIC FLAW DETECTION DEVICE (71) Applicant: IHI CORPORATION, Tokyo (JP)

(72) Inventor: Toshiaki Hamano, Tokyo (JP)

(73) Assignee: IHI CORPORATION, Tokyo (JP)

( * ) Notice: Subject to any disclaimer, the term of this patent is extended or adjusted under 35 U.S.C. 154(b) by 377 days.

(21) Appl. No.: 17/434,087

(22) PCT Filed: Feb. 28, 2020

(86) PCT No.: PCT/JP2020/008478
§ 371 (c)(1),
(2) Date: Aug. 26, 2021

(87) PCT Pub. No.: WO2020/175693
PCT Pub. Date: Sep. 3, 2020

(65) Prior Publication Data
US 2022/0137002 A1    May 5, 2022

(30) Foreign Application Priority Data
Feb. 28, 2019   (JP) .................. 2019-035536

(51) Int. Cl.
*G01N 29/04* (2006.01)
*G01N 29/06* (2006.01)
(Continued)

(52) U.S. Cl.
CPC ......... *G01N 29/069* (2013.01); *G01N 29/043* (2013.01); *G01N 29/24* (2013.01); *G01N 29/26* (2013.01); *G01N 2291/0289* (2013.01)

(58) Field of Classification Search
CPC .... G01N 29/043; G01N 29/069; G01N 29/24; G01N 29/26; G01N 2291/0289
(Continued)

(56) References Cited

U.S. PATENT DOCUMENTS 8,429,972 B2    4/2013  Karasawa
2010/0113931 A1*  5/2010  Lee .......................... A61B 8/00
                                                600/443
(Continued)

FOREIGN PATENT DOCUMENTS

JP      2006-170766 A     6/2006
JP      2006-317344 A    11/2006
(Continued)

OTHER PUBLICATIONS

JP2018119799 (Year: 2017).*

*Primary Examiner* — Mohamed Charioui
*Assistant Examiner* — Dacthang P Ngo (57) ABSTRACT

An ultrasonic flaw detection device includes: an ultrasonic probe that detects waveform data of ultrasonic echoes emitted to an inspection area of an inspection target; a processing unit that stores pieces of sampling data obtained by sampling the waveform data obtained by the ultrasonic probe at predetermined sampling intervals in a storage unit continuously in time series; and a display control unit that divides the inspection area into a plurality of divided areas and displays each of the plurality of divided areas on a display, wherein the processing unit directly or indirectly links a divided area of the plurality of divided areas to one or more waveform data containing sampling data of one or more sampling point included in the divided area.

7 Claims, 6 Drawing Sheets

(51) Int. Cl.
*G01N 29/24* (2006.01)
*G01N 29/26* (2006.01)

(58) Field of Classification Search
USPC .................................................. 702/35, 39
See application file for complete search history.

(56) References Cited

U.S. PATENT DOCUMENTS

| | | |
|---|---|---|
| 2010/0242610 A1 | 9/2010 | Karasawa |
| 2011/0087443 A1 | 4/2011 | Zhang et al. |
| 2014/0200853 A1 | 7/2014 | Guan et al. |
| 2015/0369909 A1 | 12/2015 | Lasser et al. |
| 2016/0231284 A1* | 8/2016 | Shiina ................ G01N 29/043 |
| 2017/0131220 A1 | 5/2017 | Buelsing et al. |
| 2017/0215841 A1 | 8/2017 | Pandey et al. |
| 2017/0219422 A1 | 8/2017 | Hamano et al. |
| 2018/0113100 A1 | 4/2018 | St-Laurent et al. |

FOREIGN PATENT DOCUMENTS

| | | |
|---|---|---|
| JP | 2010-227503 A | 10/2010 |
| JP | 2014-089064 A | 5/2014 |
| JP | 2018/119799 * | 1/2017 |
| JP | 2017-203786 A | 11/2017 |
| JP | 2018-119799 A | 8/2018 |
| JP | 2018-179751 A | 11/2018 |
| WO | 2016/098224 A1 | 6/2016 |

* cited by examiner

FIRST TABLE

| SAMPLING DATA | POSITION INFORMATION | ELAPSED TIME | WAVEFORM DATA NUMBER |
|---|---|---|---|
| $H_{11}$ | P1 | $T_{11}$ | S1 |
| $H_{12}$ | P1 | $T_{12}$ | S1 |
| $H_{13}$ | P1 | $T_{13}$ | S1 |
| ... | ... | ... | ... |
| $H_{1n}$ | P1 | $T_{1n}$ | S1 |
| $H_{21}$ | P2 | $T_{21}$ | S2 |
| $H_{22}$ | P2 | $T_{22}$ | S2 |
| $H_{23}$ | P2 | $T_{23}$ | S2 |
| ... | ... | ... | ... |
| $H_{2n}$ | P2 | $T_{2n}$ | S2 |
| $H_{31}$ | P3 | $T_{31}$ | S3 |
| $H_{32}$ | P3 | $T_{32}$ | S3 |
| $H_{33}$ | P3 | $T_{33}$ | S3 |
| ... | ... | ... | ... |
| $H_{3n}$ | P3 | $T_{3n}$ | S3 |
| ... | ... | ... | ... |

(B)

SECOND TABLE

| DIVIDED AREA IDENTIFICATION NUMBER | SAMPLING DATA | TAG INFORMATION |
|---|---|---|
| M1 | $H_{11}$ | S1 |
| M2 | $H_{13}$ | S1 |
| M3 | $H_{23}$ | S2 |
| M4 | $H_{32}$ | S3 |
| ... | ... | ... |

FIG. 6

ULTRASONIC FLAW DETECTION DEVICE

CROSS REFERENCE TO RELATED APPLICATIONS

This patent application is a U.S. national stage application under 35 U.S.C. § 371 of International Patent Application No. PCT/JP2020/008478 filed on Feb. 28, 2020, which claims the benefit of foreign priority to Japanese Patent Application No. JP 2019-035536 filed on Feb. 28, 2019. The International Application was published in Japanese on Sep. 3, 2020, as International Publication No. WO 2020/175693 A1 under PCT Article 21(2).

TECHNICAL FIELD

The present disclosure relates to an ultrasonic flaw detection device.
Priority is claimed on Japanese Patent Application No. 2019-035536, filed Feb. 28, 2019, the content of which is incorporated herein by reference.

BACKGROUND

Conventionally, there is a manual-type ultrasonic flaw detection device in which an examiner manually scans an inspection range of an inspection target while holding an ultrasonic probe in hand and which, at the same time, displays the intensities of ultrasonic echoes on a display. In the manual-type ultrasonic flaw detection device, the examiner determines whether or not there is a defect in the inspection target from the intensity of an ultrasonic echo indicated on the display and records the results (inspection results) thereof on paper or the like.

However, in the manual-type ultrasonic flaw detection device, the examiner has to refer to the intensity of the ultrasonic echo indicated on the display on site and to record the inspection results, so a huge burden is put on the examiner. Accordingly, in recent years, in the manual-type ultrasonic flaw detection device, an ultrasonic flaw detection device has been proposed in which while the scanning using the ultrasonic probe is manually performed, the intensity (e.g., maximum value) of an ultrasonic echo at each position in the inspection range is automatically recorded. Thereby, the examiner can review the intensity of the ultrasonic echo at each position in the inspection range later, and the burden on the examiner can be reduced.

DOCUMENT OF RELATED ART

Patent Document

[Patent Document 1] Japanese Unexamined Patent Application, First Publication No. 2006-170766

SUMMARY

Technical Problem

However, from only the intensity of the ultrasonic echo at each position in the inspection range, the examiner may not distinguish whether the echo indicates a defect or a noise, and it may be difficult to accurately distinguish the defect.
The present disclosure is made in view of such circumstances, and an object thereof is to provide an ultrasonic flaw detection device that is a manual-type ultrasonic flaw detection device such that an examiner manually scans an inspection range of an inspection target while holding an ultrasonic probe in hand and which can accurately distinguish defects.

Solution to Problem (1) One aspect of the present disclosure is an ultrasonic flaw detection device, including: an ultrasonic probe that detects waveform data of ultrasonic echoes emitted to an inspection area of an inspection target; a processing unit that stores pieces of sampling data obtained by sampling the waveform data obtained by the ultrasonic probe at predetermined sampling intervals in a storage unit continuously in time series; and a display control unit that divides the inspection area into a plurality of divided areas and displays each of the plurality of divided areas on a display, wherein the processing unit directly or indirectly links a divided area of the plurality of divided areas to one or more waveform data containing sampling data of one or more sampling point included in the divided area.

(2) In the ultrasonic flaw detection device of the above (1), the processing unit may execute an identification process for identifying, for each piece of sampling data, which divided area of the plurality of divided areas a position of the sampling point corresponds to and may directly or indirectly link one or more waveform data containing the sampling data in which the corresponding divided area is identified and the corresponding divided area to each other.

(3) The ultrasonic flaw detection device of the above (2) may include: an operation unit, wherein when any divided area is selected from the plurality of divided areas through the operation unit, the display control unit may read the waveform data directly or indirectly linked to the selected divided area and may display the read waveform data on the display.

(4) In the ultrasonic flaw detection device of the above (2) or (3), the processing unit may allocate the sampling data in which the corresponding divided area is identified through the identification process to the corresponding divided area.

(5) In the ultrasonic flaw detection device of the above (4), the display control unit may fill the divided area to which the sampling data is allocated with a color according to a value of the sampling data.

(6) In the ultrasonic flaw detection device of any one of the above (2) to (5), when two or more pieces of sampling data correspond to one divided area as a result of the identification process, the processing unit may execute a selection process for selecting one piece of sampling data from the two or more pieces of sampling data and may allocate the selected piece of sampling data through the selection process to the divided area to which the selected piece of sampling data corresponds.

(7) The ultrasonic flaw detection device of any one of the above (2) to (6) may include: a sheet material attached to a surface of the inspection target and having two-dimensional patterns shown thereon, the two-dimensional patterns being arranged on the inspection target and indicating positions on the inspection target; and an imaging device attached to the ultrasonic probe and imaging the two-dimensional patterns, wherein the processing unit may read position information indicating a position on the inspection target from a captured image captured by the imaging device and may relate each piece of sampling data of the waveform data obtained by the ultrasonic probe to the position information read from the captured image obtained at the same time as the waveform data.

(8) In the ultrasonic flaw detection device of the above (7), the processing unit may determine an index indicating a degree of quality of the waveform data from the captured image obtained at the same time as the waveform data, may relate the determined index to each piece of sampling data of the waveform data, and when two or more pieces of sampling data correspond to one divided area as a result of the identification process, may select the sampling data having the highest index from the two or more pieces of sampling data.

(9) In the ultrasonic flaw detection device of the above (7) or (8), in the identification process, the processing unit identifies, based on the position information, which divided area of the plurality of divided areas a position of each sampling point of the sampling data related to the position information corresponds to.

Effects

As described above, according to the present disclosure, in the manual-type ultrasonic flaw detection device such that the examiner manually scans the inspection range of the inspection target while holding the ultrasonic probe in hand, it is possible to accurately distinguish defects.

DESCRIPTION OF EMBODIMENTS

Hereinafter, an ultrasonic flaw detection device of an embodiment is described with reference to the drawings.

An ultrasonic flaw detection device A of this embodiment is used for an ultrasonic flaw detection inspection of an object (inspection target) and detects flaws in the inspection target. In this embodiment, the ultrasonic flaw detection device A regards a pipe K as the inspection target and detects flaws such as cracks occurring at weld lines of the pipe K. The ultrasonic flaw detection device A is a manual-type ultrasonic flaw detection device such that an examiner manually scans an inspection range of the inspection target while holding an ultrasonic probe 2 in hand.

Figure 1:
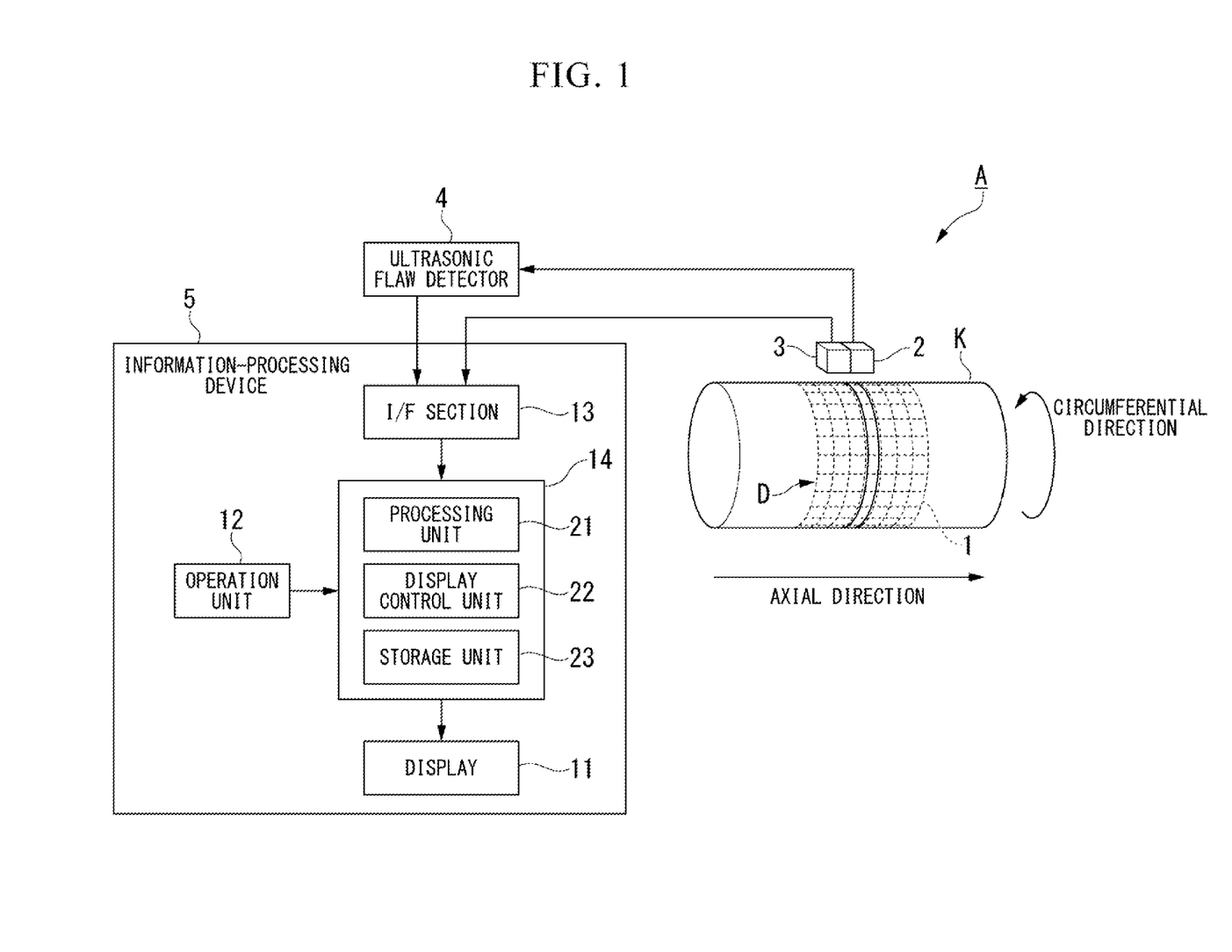
FIG. 1 is a diagram showing an example of a schematic configuration of an ultrasonic flaw detection device of an embodiment.

FIG. 1 is a diagram showing an example of the schematic configuration of the ultrasonic flaw detection device of this embodiment. As shown in FIG. 1, the ultrasonic flaw detection device A includes a sheet material 1, the ultrasonic probe 2, an imaging device 3, an ultrasonic flaw detector 4 and an information-processing device 5.

Figure 2:
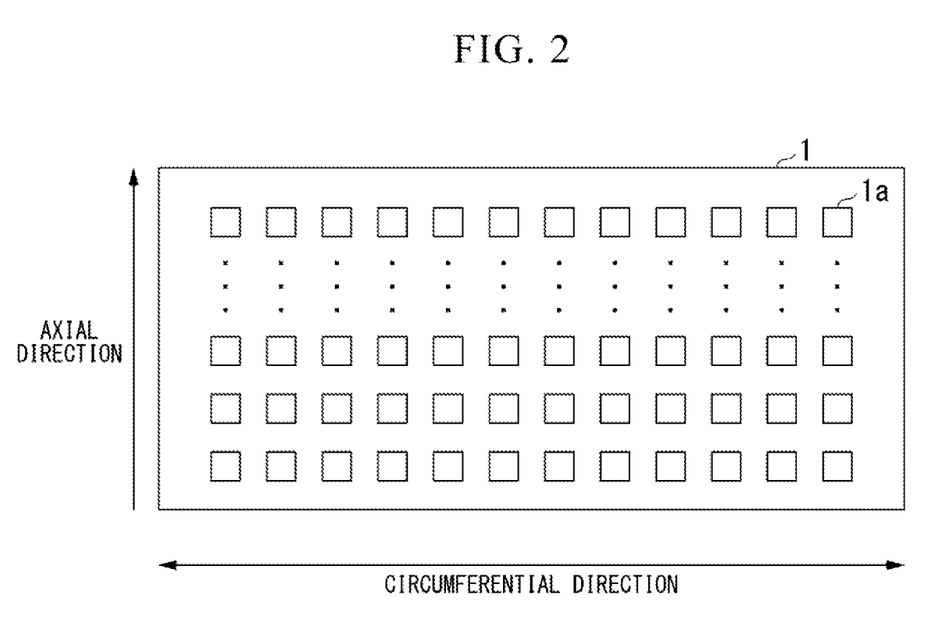
FIG. 2 is a diagram showing an example of a sheet material of the embodiment.

The sheet material 1 is attached to a surface of the pipe K. As shown in FIG. 2, the sheet material 1 has a plurality of two-dimensional patterns 1a shown on its surface. The plurality of two-dimensional patterns 1a are arranged on the pipe K and indicate positions on the pipe K. For example, two-dimensional patterns 1a are shown in the sheet material 1 to be arranged in the axial direction (central axis direction) and the circumferential direction of the pipe K. In the two-dimensional pattern 1a, information (hereinafter referred to as "position information") indicating a position (coordinates) on the pipe K is encrypted. For example, the two-dimensional patterns 1a are arranged at intervals of 10 mm in the axial direction and the circumferential direction of the pipe K. For example, the two-dimensional pattern 1a is a QR code®. The sheet material 1 is provided in an area of the outer surface of the pipe K that is scanned by the ultrasonic probe.

The sheet material 1 may not be only directly attached to the surface of the pipe K but may be attached to the surface of the pipe K in a state where a contact medium for transmitting ultrasonic waves is applied to the surface of the pipe K. When the sheet material 1 is attached to the pipe K through the contact medium applied onto the pipe K in this way, the sheet material 1 can be adhered to the pipe K with the adhesiveness of the contact medium. The contact medium allows the sheet material 1 to be attached flat (i.e., along a peripheral surface extending in the axial direction and the circumferential direction) even if the surface of the pipe K is uneven. The contact medium may be a substance that transmits ultrasonic waves while limiting the attenuation thereof and is, for example, glycerin, water, oil or the like.

The ultrasonic probe 2 is connected to the ultrasonic flaw detector 4 through a coaxial cable and can be moved on the pipe K (on the outer surface of the pipe K). The ultrasonic probe 2 emits ultrasonic waves from a portion thereof and detects the reflected waves of the ultrasonic waves. The ultrasonic probe 2 outputs the detected reflected waves (echoes) as waveform data W to the ultrasonic flaw detector 4. For example, the ultrasonic probe 2 scans an inspection range D of the pipe K by ultrasonic waves while being moved on the surface of the pipe K manually by the examiner and detects echoes indicating cracks or the like in the pipe K.

The imaging device 3 is attached to the ultrasonic probe 2. In other words, the imaging device 3 is connected to the ultrasonic probe 2 and is moved in conjunction with the movement of the ultrasonic probe 2. The imaging device 3 is, for example, an optical imaging device that captures images of the two-dimensional patterns 1a of the sheet material 1 attached onto the pipe K. The imaging device 3 is connected to the ultrasonic flaw detector 4 through a signal cable. The imaging device 3 outputs captured images G of the imaged two-dimensional patterns 1a to the ultrasonic flaw detector 4. For example, the imaging device 3 includes a light-emitting unit provided with a light-emitting element such as an LED (Light Emitting Diode) and an imaging unit such as a CCD (Charge Coupled Device) camera and is attached to the trailing side in the moving direction of the ultrasonic probe 2. The imaging device 3 may be integrated with the ultrasonic probe 2 in an equal housing or may have a separated structure therefrom.

For example, the ultrasonic probe 2 and the imaging device 3 may be integrated as an inspection probe. For the configuration of the inspection probe of this embodiment, for example, the configuration of an inspection probe shown in PCT International Publication No. WO 2016/098224 can be used.

The ultrasonic flaw detector 4 is connected to the ultrasonic probe 2 and the information-processing device 5. The ultrasonic flaw detector 4 supplies electric power to the ultrasonic probe 2 and the imaging device 3. The ultrasonic flaw detector 4 A/D-converts the waveform data W input from the ultrasonic probe 2 and outputs it to the information-processing device 5. That is, the ultrasonic flaw detector 4 outputs pieces of sampling data obtained by sampling the waveform data W detected by the ultrasonic probe 2 at predetermined sampling intervals to the information-processing device 5. In other words, the ultrasonic flaw detector 4 includes an A/D converter. The directions of arrows in FIG. 1 indicate directions in which the waveform data W flows and have nothing to do with the direction of the above-described electric power supply.

The ultrasonic probe 2 may be supplied with electric power from the ultrasonic flaw detector 4, and the imaging device 3 may be supplied with electric power from the information-processing device 5. The connection to the ultrasonic probe 2 and the imaging device 3 is not limited only to wired connection but may also be wireless connection.

The information-processing device 5 is connected to the ultrasonic flaw detector 4. For example, the information-processing device 5 is a desktop or laptop computer.

The information-processing device 5 of this embodiment is described below. As shown in FIG. 1, the information-processing device 5 includes a display 11, an operation unit 12, a communication I/F section 13 and a control unit 14.

The display 11 displays the information from the control unit 14 on its display screen. For example, the display 11 is a CRT (Cathode Ray Tube) display or a liquid crystal display and displays various information under the control of the control unit 14.

The operation unit 12 accepts user's operations and outputs, to the control unit 14, operation instructions corresponding to the operations received from the user. For example, the operation unit 12 is a pointing device such as a mouse, a keyboard, or another operating device.

The communication I/F section 13 sends and receives various signals to and from the ultrasonic flaw detector 4 through a communication cable under the control of the control unit 14. The communication I/F section 13 transmits, to the control unit 14, the waveform data W received from the ultrasonic flaw detector 4 through the communication cable.

The communication I/F section 13 is connected to the imaging device 3 through a signal cable and receives captured images G of the two-dimensional patterns 1a captured by the imaging device 3. The communication I/F section 13 A/D-converts the image information of the received captured images G and transmits it to the control unit 14.

For example, the control unit 14 includes a CPU (Central Processing Unit), a ROM (Read Only Memory), a RAM (Random Access Memory) and the like.

The functional units of the control unit 14 of this embodiment are described below. The control unit 14 of this embodiment includes a processing unit 21, a display control unit 22 and a storage unit 23. The processing unit 21 and the display control unit 22 may each include a CPU, a ROM, a RAM and the like. The storage unit 23 may include a storage device such as a ROM and a RAM.

The processing unit 21 executes a reading process that reads position information P indicating a position on the inspection target (pipe K) from the captured image G. That is, the processing unit 21 executes the reading process that reads the position information P encrypted in the two-dimensional pattern 1a shown in the captured image G by analyzing this captured image G. The position information P may contain the inclination θ of the ultrasonic probe 2. The inclination θ of the ultrasonic probe 2 is, for example, the inclination of the ultrasonic probe 2 with respect to the inspection target and is the incident angle of ultrasonic waves emitted to the inspection target. For example, the inclination θ is the angle of the ultrasonic probe 2 with respect to an XY plane in a case where the circumferential direction is set to be parallel to an X direction and the axial direction is set to be parallel to a Y direction. A Z direction is a direction perpendicular to the XY plane. The processing unit 21 may determine the inclination θ by calculation or may obtain it based on the measurement results of a sensor (e.g., gyro sensor) provided in the ultrasonic probe 2 to measure the inclination θ.

The processing unit 21 continuously in time series stores, in the storage unit 23, pieces of sampling data obtained by sampling the waveform data W obtained by the ultrasonic probe 2 at predetermined sampling intervals. At this time, the processing unit 21 relates the position information P read through the reading process to each piece of sampling data of the waveform data W received from the ultrasonic flaw detector 4 at the time the captured image G used for this reading process was obtained and stores them as a data set in the storage unit 23.

Figure 3:
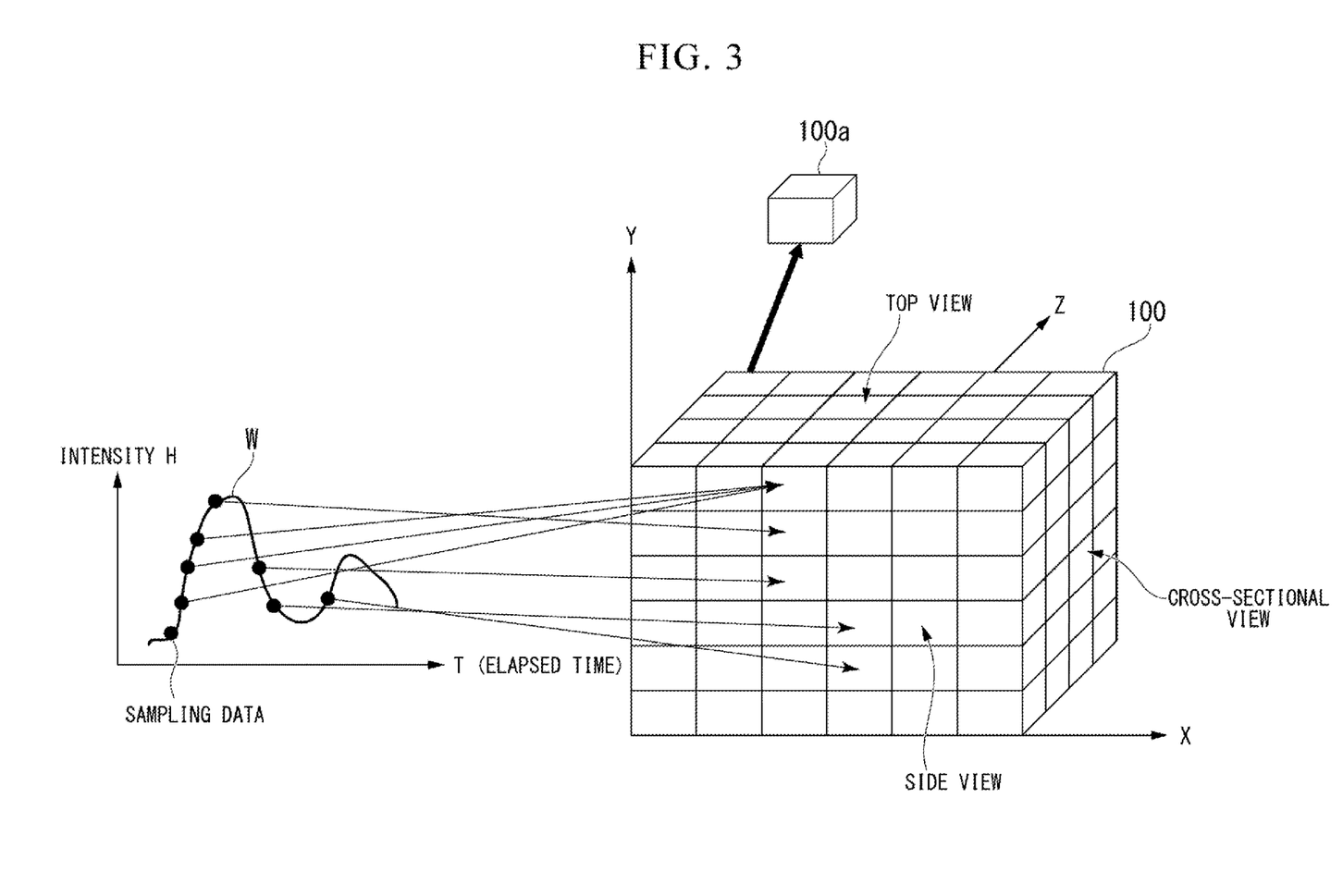
FIG. 3 is a diagram showing an identification process of the embodiment.

The processing unit 21 divides an inspection area 100 (refer to FIG. 3) into a plurality of divided areas 100a. For example, as shown in FIG. 3, the processing unit 21 divides the three-dimensional inspection area 100 by a three-dimensional mesh of XYZ coordinates to divide the inspection area 100 into the plurality of divided areas 100a. The processing unit 21 identifies which divided area 100a a sampling point with respect to each of all the sampling data H stored in the storage unit 23 is contained in (i.e., corresponds to). The processing unit 21 directly or indirectly links the waveform data that is the original data of the sampling data H to the divided area 100a in which this sampling data is contained. The original data of the sampling data H denotes the waveform data W containing this sampling data H.

Specifically, the processing unit 21 executes an identification process that identifies, for each piece of sampling data, which divided area of the plurality of divided areas 100a the position of each sampling point of all of the data sets (the sampling data H and the position information) in time series stored in the storage unit 23 in a first process corresponds to.

For example, the processing unit 21 uses the position information and beam path information related to the sampling data and thereby geometrically calculates the position in a XYZ coordinate system of each sampling point of the waveform data related to this position information. The processing unit 21 identifies, for each piece of sampling data H, which divided area of the plurality of divided areas 100a the position of the sampling point in the XYZ coordinate system corresponds to.

Next, the processing unit 21 executes an allocation process that allocates one of the sampling data H to each divided area 100a based on the identification results of the identification process. In this embodiment, only one of the sampling data H can be allocated to one divided area 100a.

The processing unit 21 allocates, in the allocation process, the sampling data H of each sampling point to the divided area 100a to which this sampling data H corresponds.

When two or more pieces of sampling data H correspond to one divided area 100a, the processing unit 21 executes a selection process that selects one piece of sampling data H from the two or more pieces of sampling data H and executes the allocation process that allocates the sampling data H selected through the selection process to the divided area 100a to which this sampling data H corresponds. For example, when two or more pieces of sampling data H correspond to one divided area 100a, the processing unit 21 may execute the selection process that compares the two or more pieces of sampling data H with each other and selects one having the greatest sampling value. For example, when the processing unit 21 allocates sampling data H (first sampling data) to one divided area 100a, if other sampling data H (second sampling data) has been allocated to this divided area 100a, the processing unit 21 compares the first sampling data with the second sampling data and allocates the sampling data H having a greater value to this divided area 100a.

The processing unit 21 may directly or indirectly links, as a linking process, the divided area 100a to which the sampling data H is allocated and the waveform data W that is the original data of this sampling data H to each other. For example, when the processing unit 21 allocates the sampling data H to the divided area 100a, the processing unit 21 may set, as the linking process, tag information to this divided area 100a, and the tag information is used for searching the storage unit 23 for the waveform data W that is the original data of this sampling data H. The processing unit 21 may execute the linking process by linking the waveform data W to each of the pieces of sampling data H of this waveform data W and setting, to the sampling data H allocated to any divided area 100a, information indicating which divided area 100a this sampling data H is allocated to.

The display control unit 22 divides the inspection area 100 into the plurality of divided areas 100a and displays the plurality of divided areas 100a on the display 11. The display control unit 22 fills each divided area 100a displayed on the display 11 with color (red, blue, yellow or the like) according to the value of the sampling data H allocated to this divided area 100a by the processing unit 21. Thereby, the display control unit 22 can display, on the display 11, a flaw detection distribution data image in which the intensities of the echoes are mapped onto the divided areas 100a of the inspection area.

When any divided area 100a is selected from the plurality of divided areas 100a through the operation unit 12, the display control unit 22 reads the waveform data W linked directly or indirectly to the selected divided area 100a and displays the waveform data W on the display 11.

Figure 4:
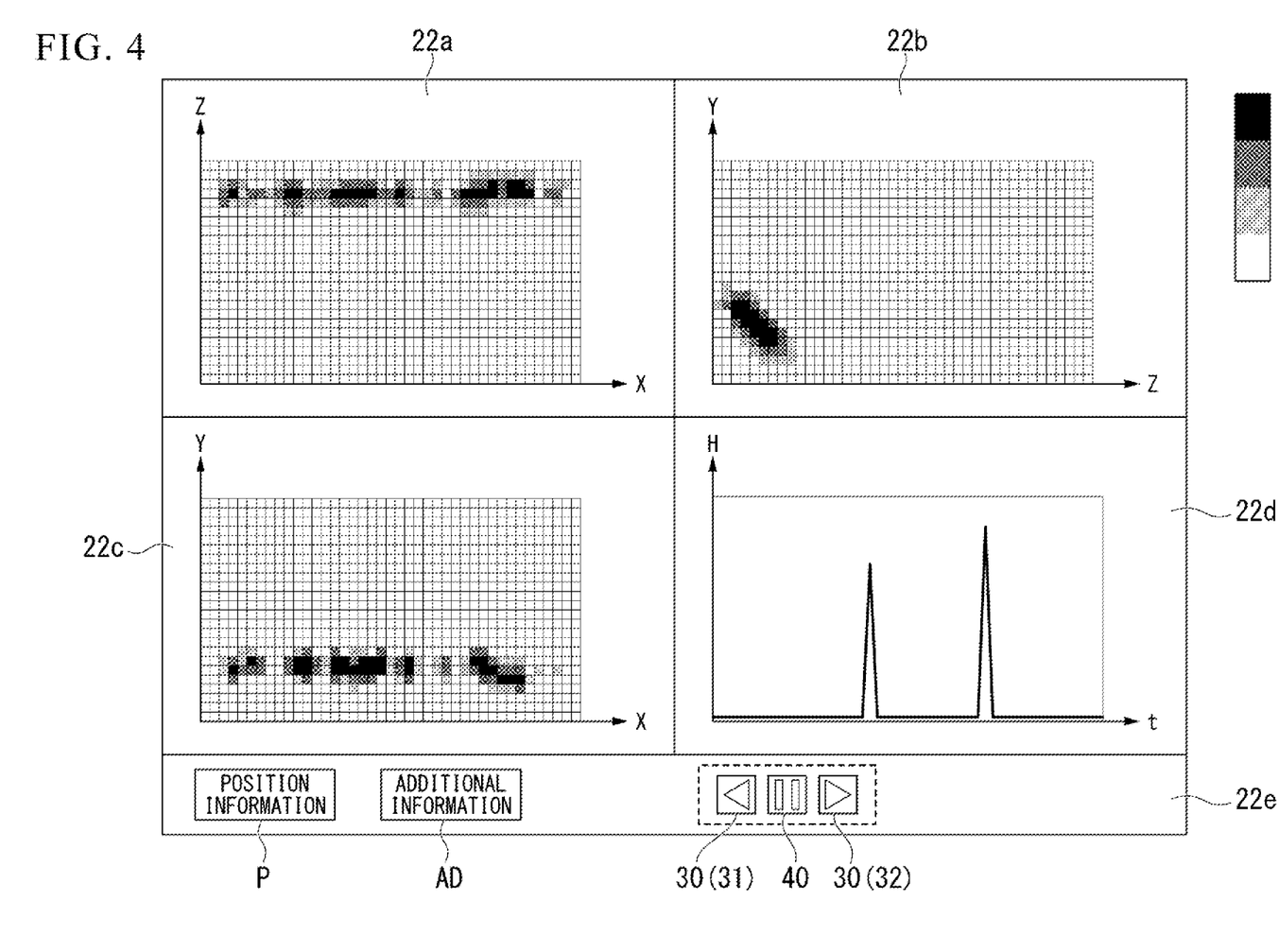
FIG. 4 is a diagram showing an example of a display screen displayed on a display by a display control unit of the embodiment.

An example of the display screen displayed on the display 11 by the display control unit 22 of this embodiment is described below. FIG. 4 is a diagram showing an example of the display screen displayed on the display 11 by the display control unit 22 of this embodiment.

As shown in FIG. 4, the display control unit 22 divides one screen of the display 11 approximately into five screens (first screen 22a to fifth screen 22e). The display control unit 22 displays the inspection area 100 divided into the plurality of divided areas 100a on the first screen 22a to the third screen 22c as a trihedral figure of a plan view, a cross-sectional view and a side view in the XYZ coordinate system. Specifically, the display control unit 22 displays, on the first screen 22a, a view (plan view, i.e., a view viewed in a direction perpendicular to an XZ plane) in which the inspection area 100 divided into the plurality of divided areas 100a is viewed from the XZ plane. The display control unit 22 fills each divided area 100a in the first screen 22a when the inspection area 100 divided into the plurality of divided areas 100a is viewed from the XZ plane with a color according to the highest sample value (sampling value) of a plurality of divided areas 100a arranged in a Y direction and corresponding to the divided area 100a displayed on the first screen 22a.

The display control unit 22 displays, on the second screen 22b, a view (cross-sectional view, i.e., a view viewed in a direction perpendicular to a YZ plane) in which the inspection area 100 divided into the plurality of divided areas 100a is viewed from the YZ plane. The display control unit 22 fills each divided area 100a in the second screen 22b when the inspection area 100 divided into the plurality of divided areas 100a is viewed from the YZ plane with a color according to the highest sample value of a plurality of divided areas 100a arranged in an X direction and corresponding to the divided area 100a displayed on the second screen 22b.

The display control unit 22 displays, on the third screen 22c, a view (side view, i.e., a view viewed in a direction perpendicular to an XY plane) in which the inspection area 100 divided into the plurality of divided areas 100a is viewed from the XY plane. The display control unit 22 fills each divided area 100a in the third screen 22c when the inspection area 100 divided into the plurality of divided areas 100a is viewed from the XY plane with a color according to the highest sample value of a plurality of divided areas 100a arranged in a Z direction and corresponding to the divided area 100a displayed on the third screen 22c.

When any divided area 100a is selected from the plurality of divided areas 100a through the operation unit 12, the display control unit 22 reads the waveform data W linked directly or indirectly to the selected divided area 100a and displays it on the fourth screen 22d.

When any divided area 100a is selected from the plurality of divided areas 100a through the operation unit 12, the display control unit 22 displays the position information P related to the sampling data H allocated to the selected divided area 100a on the fifth screen 22e. The display control unit 22 may display information such as a swing angle and a refraction angle on the fifth screen 22e as additional information of the waveform data W displayed on the fourth screen 22d.

The display control unit 22 displays, on the fifth screen 22e, a play button 30 that causes the fourth screen 22d to play the waveform data W before and after the waveform data W displayed on the fourth screen 22d, and a stop button 40 that stops the playback. The play button 30 includes a first play button 31 and a second play button 32.

When the first play button 31 is selected by the operation unit 12, the display control unit 22 executes a first playback process in which the waveform data just anterior to the waveform data W displayed on the fourth screen 22d on the time base is sequentially read and is displayed on the fourth screen 22d. On the other hand, when the second play button 32 is selected by the operation unit 12, the display control unit 22 executes a second playback process in which the waveform data just posterior to the waveform data W displayed on the fourth screen 22d on the time base is sequentially read and is displayed on the fourth screen 22d. When the stop button 40 is selected by the operation unit 12, the display control unit 22 stops the first playback process and the second playback process.

Figure 5:
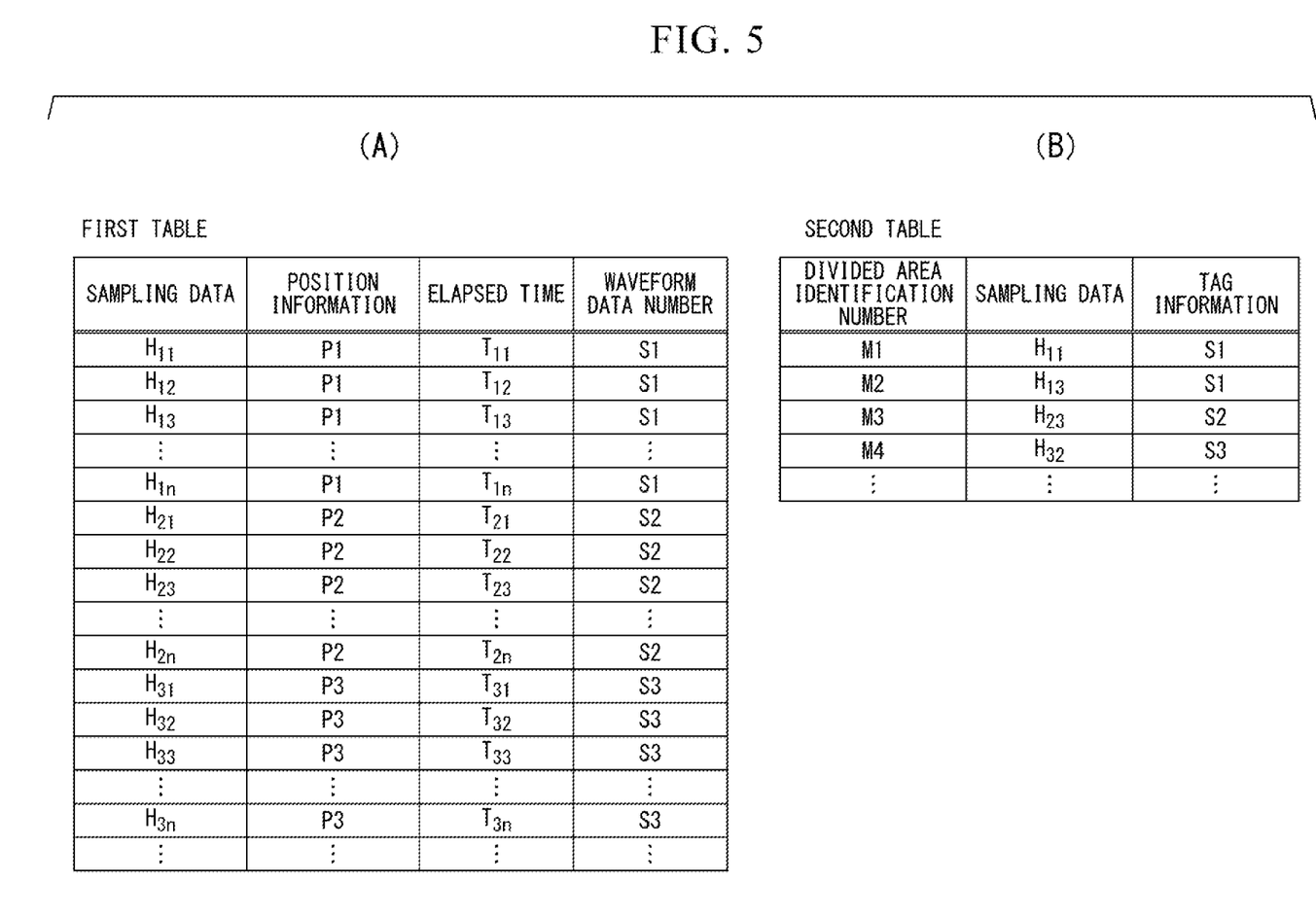
FIG. 5 is a diagram showing an example of information stored in a storage unit of the embodiment in a table format.

In the storage unit 23, information and the like in which each piece of sampling data H of the waveform data W and the position information P are related to each other are stored continuously in time series. FIG. 5 shows an example of information stored in the storage unit 23 in a table format. The storage unit 23 is provided with a first table and a second table.

Part (A) of FIG. 5 shows an example of information stored in the first table. In the first table, the sampling data H of each waveform data W output from the ultrasonic probe 2 and the position information P of the ultrasonic probe 2 are related and stored continuously in time series. In the first table, each information of an elapsed time and a waveform data number is stored in a related state to each piece of sampling data H.

The elapsed time is a period of time from emitting ultrasonic waves until obtaining each piece of sampling data H. The waveform data number is a number for identifying the waveform data W that is the original data of each piece of sampling data H. Therefore, pieces of sampling data H obtained by sampling one piece of waveform data W are related with an equal waveform data number and are stored in the first table.

Part (B) of FIG. 5 shows an example of information stored in the second table. In the second table, pieces of information such as a divided area identification number that is a number for identifying each divided area 100*a*, the sampling data H allocated to the divided area 100*a* indicated by each divided area identification number, and the tag information indicating the waveform data W that is the original data of the sampling data H contained in (corresponding to) the divided area 100*a* indicated by this divided area identification number are related and stored. The second table is created through the above linking process. The tag information of this embodiment is the waveform data number.

Figure 6:
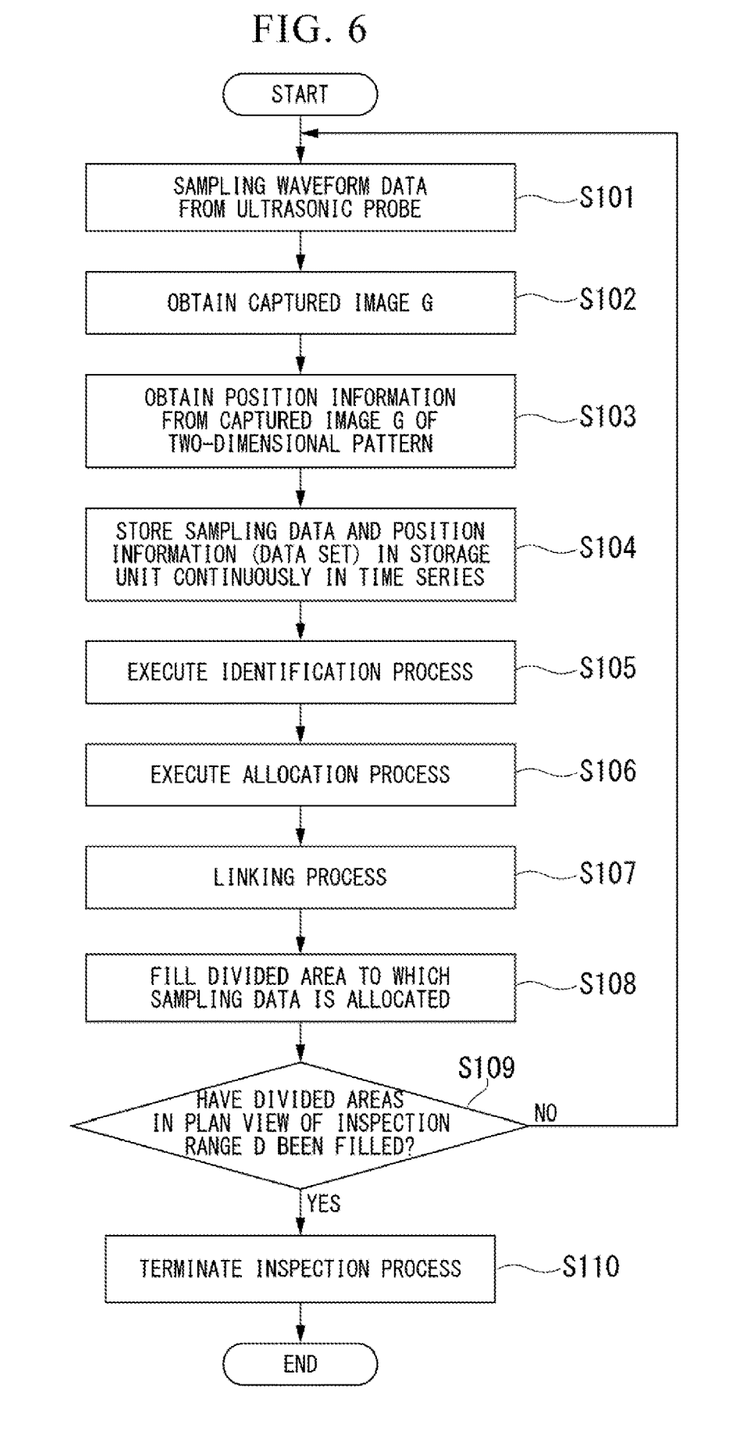
FIG. 6 is a flow chart of the ultrasonic flaw detection device of the embodiment.

Next, the operation of the ultrasonic flaw detection device A of this embodiment is described with reference to FIGS. 5 and 6. FIG. 6 is a flow chart of the ultrasonic flaw detection device A of this embodiment.

The examiner scans an inspection portion on the pipe K while holding the ultrasonic probe 2 in hand in order to detect defects, such as cracks, and corrosion that occur in the pipe K. For example, the examiner moves the ultrasonic probe 2 in the axial direction to scan from a first end to a second end in the axial direction. Next, when the ultrasonic probe 2 reaches the second end, the examiner shifts the ultrasonic probe 2 in the circumferential direction to a position and makes the ultrasonic probe 2 scan from the position toward the first end in the axial direction. Then, the examiner repeats the above scanning using the ultrasonic probe 2 to scan the entire inspection portion on the pipe K, that is, the entire inspection area 100.

At this time, the ultrasonic probe 2 detects the reflected waves of the emitted ultrasonic waves and outputs the waveform data W of the reflected waves (echoes) to the ultrasonic flaw detector 4. The ultrasonic flaw detector 4 outputs pieces of sampling data H obtained by sampling the waveform data W obtained by the ultrasonic probe 2 at predetermined sampling intervals to the information-processing device 5 (step S101). The imaging device 3 outputs the captured images G of the imaged two-dimensional patterns 1*a* to the information-processing device 5 (step S102).

When the processing unit 21 receives sampling data H of waveform data Wt and a captured image Gt at the same time or in a period of time that can be regarded as the same time, the processing unit 21 executes the reading process to obtain position information Pt (e.g., absolute coordinates) on the pipe K based on the two-dimensional pattern 1a (e.g., QR code®) included in the captured image G by the imaging device 3 (step S103). Then, the processing unit 21 relates the sampling data H of the waveform data Wt from the ultrasonic probe 2 to the position information Pt and stores them in the storage unit 23 continuously in time series (step S104).

For example, it is exemplified that the examiner scans while manually moving the ultrasonic probe 2, and thereby the ultrasonic flaw detector 4 obtains, as the waveform data from the ultrasonic probe 2, waveform data W1, waveform data W2, and waveform data W3 in time series. The waveform data W1 is data when the position information P of the ultrasonic probe 2 is position information P1. The waveform data W2 is data when the position information P of the ultrasonic probe 2 is position information P2. The waveform data W3 is data when the position information P of the ultrasonic probe 2 is position information P3.

In this case, the ultrasonic flaw detector 4 samples the waveform data W1 at predetermined sampling intervals and transmits sampling data H11 to H1*n* of this waveform data W1 to the information-processing device 5 continuously in time series. Next, the ultrasonic flaw detector 4 samples the waveform data W2 at predetermined sampling intervals and transmits sampling data H21 to H2*n* of this waveform data W2 to the information-processing device 5 continuously in time series. Next, the ultrasonic flaw detector 4 samples the waveform data W3 at predetermined sampling intervals and transmits sampling data H31 to H3*n* of this waveform data W3 to the information-processing device 5 continuously in time series.

The processing unit 21 relates the sampling data H11 to H1*n* to the position information P1 obtained through the reading process at the same time as or in a period of time that can be regarded as the same time as the sampling data H11 to H1*n* are obtained from the ultrasonic flaw detector 4 and stores them in the first table of the storage unit 23 continuously in time series. Next, the processing unit 21 relates the sampling data H21 to H2*n* to the position information P2 obtained through the reading process at the same time as or in a period of time that can be regarded as the same time as the sampling data H21 to H2*n* are obtained from the ultrasonic flaw detector 4 and stores them in the first table of the storage unit 23 continuously in time series. Next, the processing unit 21 relates the sampling data H31 to H3*n* to the position information P3 obtained through the reading process at the same time as or in a period of time that can be regarded as the same time as the sampling data H23 to H3*n* are obtained from the ultrasonic flaw detector 4 and stores them in the first table of the storage unit 23 continuously in time series. In this way, the processing unit 21 stores pieces of sampling data H obtained by sampling the waveform data W obtained by the ultrasonic probe 2 at predetermined sampling intervals in the storage unit 23 continuously in time series. Each piece of sampling data H is related with the elapsed time T.

The processing unit 21 relates each piece of sampling data H with the waveform data number of the waveform data W that is the original data thereof and stores it in the first table. For example, each of the sampling data H11 to H1*n* is related with a waveform data number Si indicating the waveform data W1, each of the sampling data H21 to H2*n* is related with a waveform data number S2 indicating the waveform data W2, each of the sampling data H31 to H3*n* is related with a waveform data number S3 indicating the waveform data W3, and each piece of sampling data is stored in the first table.

The processing unit 21 divides the inspection area 100 by a three-dimensional mesh of XYZ coordinates to divide the inspection area 100 into a plurality of divided areas 100*a*. Then, the processing unit 21 executes the identification process for each sampling point of all the sampling data H in time series stored in the storage unit 23 to identify which divided area of the plurality of divided areas 100*a* the position of the sampling point corresponds to (step S105). For example, the processing unit 21 uses the position information P and the information of the elapsed time T related to the sampling data H from the first table and geometrically calculates the position in the XYZ coordinate system of each sampling point of the waveform data related to this position information P. Then, the processing unit 21 identifies which divided area of the plurality of divided areas 100a the position in the XYZ coordinate system of the sampling point corresponds to for each piece of sampling data H stored in the storage unit 23. Next, the processing unit 21 executes the allocation process to allocate the sampling data H of each sampling point to the divided area 100a obtained through the identification process to which this sampling data H corresponds (step S106). However, in this embodiment, only one piece of sampling data H can be allocated to one divided area 100a. Therefore, in this embodiment, when two or more pieces of sampling data H correspond to one divided area 100a, the processing unit 21 compares the two or more pieces of sampling data H with each other and allocates the sampling data having the greatest sampling value thereto.

The processing unit 21 executes the linking process to directly or indirectly link the divided area 100a to which the sampling data H is allocated and the waveform data W that is the original data of the sampling data H contained in this divided area 100a to each other (step S107). The sampling data H contained in the divided area 100a is one or more sampling data H identified to correspond to this divided area 100a through the identification process. For example, the processing unit 21 directly or indirectly links, as the linking process, the divided area 100a to which the sampling data H is allocated and the waveform data W that is the original data of this sampling data H to each other. As an example of the linking process, when the sampling data H is allocated to the divided area 100a the processing unit 21 set, to this divided area 100a, tag information for searching the storage unit 23 for the waveform data W that is the original data of this sampling data H.

It is exemplified that the processing unit 21 allocates the sampling data H11 to the divided area 100a having a divided area identification number M1, allocates the sampling data H13 to the divided area 100a having a divided area identification number M2, allocates the sampling data H23 to the divided area 100a having a divided area identification number M3, and allocates the sampling data H32 to the divided area 100a having a divided area identification number M4. In this case, the processing unit 21 links the divided area identification number M1, the sampling data H11, and the waveform data number S1 of the waveform data W1 that is the original data of the sampling data H11 as tag information to each other and stores them in the second table. The processing unit 21 links the divided area identification number M2, the sampling data H13, and the waveform data number S1 of the waveform data W1 that is the original data of the sampling data H13 as tag information to each other and stores them in the second table. The processing unit 21 links the divided area identification number M3, the sampling data H23, and the waveform data number S2 of the waveform data W2 that is the original data of the sampling data H23 as tag information to each other and stores them in the second table. The processing unit 21 links the divided area identification number M4, the sampling data H32, and the waveform data number S3 of the waveform data W3 that is the original data of the sampling data H32 as tag information to each other and stores them in the second table.

The display control unit 22 fills the divided area 100a where the scanning by the inspection probe is finished and displays it on the display 11. For example, the display control unit 22 displays the plan view (XZ plane) of the inspection range D divided into the plurality of divided areas 100a on the display 11, fills the divided area 100a to which the sampling data H is allocated and displays it on the display 11 (step S108).

The processing unit 21 determines whether or not all of the divided areas 100a on the plan view (XZ plane) of the inspection range D have been filled (step S109). When all of the divided areas 100a on the plan view (XZ plane) of the inspection range D have been filled, the processing unit 21 terminates an inspection process shown in FIG. 6 (step S110). That is, the processing unit 21 terminates the inspection process when the sampling data H has been allocated to each of the divided areas 100a on the plan view (XZ plane) of the inspection range D. On the other hand, the processing unit 21 does not terminate the process shown in FIG. 6 when at least one of the divided areas 100a on the plan view (XZ plane) of the inspection range D is not filled. That is, when the sampling data H is not allocated to at least one of the divided areas 100a on the plan view (XZ plane) of the inspection range D, the inspection process is not terminated. Therefore, the examiner scans using the inspection prove such that all of the divided areas on the plan view (XZ plane) of the inspection range D are filled while referring to the display 11, and thus it is possible to prevent inspection omission.

When the inspection process is completed, the display control unit 22 displays, in the first screen 22a, a view (plan view) in which the inspection area 100 divided into the plurality of divided areas 100a is viewed from the XZ plane. Then, the display control unit 22 fills each divided area 100a in the first screen 22a when the inspection area 100 divided into the plurality of divided areas 100a is viewed from the XZ plane with a color according to the highest sample value of a plurality of divided areas 100a arranged in the Y direction and corresponding to the divided area 100a in the first screen 22a. The display control unit 22 displays, in the second screen 22b, a view (cross-sectional view) in which the inspection area 100 divided into the plurality of divided areas 100a is viewed from the YZ plane. The display control unit 22 fills each divided area 100a in the second screen 22b when the inspection area 100 divided into the plurality of divided areas 100a is viewed from the YZ plane with a color according to the highest sample value of a plurality of divided areas 100a arranged in the X direction and corresponding to the divided area 100a in the second screen 22b. The display control unit 22 displays, in the third screen 22c, a view (side view) in which the inspection area 100 divided into the plurality of divided areas 100a is viewed from the XY plane. The display control unit 22 fills each divided area 100a in the third screen 22c when the inspection area 100 divided into the plurality of divided areas 100a is viewed from the XY plane with a color according to the highest sample value of a plurality of divided areas 100a arranged in the X direction and corresponding to the divided area 100a in the third screen 22c.

By only referring to the first screen 22a to the third screen 22c, the examiner cannot distinguish whether the echo indicates a defect or a noise and cannot accurately distinguish defects. Accordingly, in this embodiment, the examiner can operate the operation unit 12 to select any one of the divided areas 100a, thereby displaying, on the display 11, the waveform data that is the original data of the sampling data H allocated to the selected divided area 100a. For example, when any divided area 100a is selected from the plurality of divided areas 100a through the operation unit 12, the processing unit 21 reads the tag information (waveform data number) linked to the divided area identification number of the selected divided area 100a from the second table. Then, the processing unit 21 reads, from the first table, all the sampling data (waveform data) related to the waveform data number that is the tag information read from the second table and displays them in the fourth screen 22d. Specifically, as shown in FIG. 5 as an example, when the divided area identification number of the divided area 100a selected by the operation unit 12 is M1, the processing unit 21 reads the waveform data number S1 as the tag information linked to M1 from the second table. Then, the processing unit 21 reads, from the first table, all of the sampling data H11 to H1n (waveform data W1) related to the waveform data number S1 read from the second table and displays them in the fourth screen 22d.

Thereby, the examiner can grasp the movement of the echo and the movement of the inspection probe, and thus it is possible to distinguish whether the echo indicates a defect or a noise and to accurately distinguish defects.

Hereinbefore, the embodiment of the present disclosure has been described in detail with reference to the drawings, but the specific configuration is not limited to this embodiment, and design changes in the scope of the present disclosure are also included.

(First Modification) When two or more pieces of sampling data H correspond to one divided area 100a, as the selection process, the above processing unit 21 compares the two or more pieces of sampling data H with each other and selects the sampling data H having the greatest sampling value, but the present disclosure is not limited to this. For example, when two or more pieces of sampling data H correspond to one divided area 100a, as the selection process, the processing unit 21 may select the sampling data H having the highest contact rate. The contact rate indicates a rate of contact between the surface of the pipe K and the sheet material 1. Specifically, the processing unit 21 executes an air pocket detection process that detects an area (hereinafter referred to as "air pocket area") of air pockets shown in a predetermined area of the captured image G based on the image information of the captured image G. The predetermined area may be the entire captured image G or an area set in advance of the captured image G. For example, the processing unit 21 performs a predetermined image process on the captured image G using the image information of the captured image G to detect the air pocket area of the captured image G. The predetermined image process is a process for detecting the air pocket area HA, and a known image process such as a binarization process may be used therefor. The detecting the air pocket area HA denotes, for example, obtaining the number Na of pixels of the air pocket area HA. The captured images G to be used for the reading process and the air pocket detection process are equal.

The processing unit 21 executes a calculation process in which the ratio of the air pocket area to the predetermined area of the captured image G is determined and the contact rate is determined from the ratio. For example, the processing unit 21 obtains the ratio of the number Na of pixels to the number Ns of total pixels of the predetermined area in the captured image G through the calculation process. The processing unit 21 determines the contact rate R using the following formula (1).

$$\text{The contact rate } R \ [\%] = (1 - Na/Ns) \times 100 \quad (1)$$

Next, the processing unit 21 relates the contact rate obtained through the calculation process to the sampling data H of the waveform data W received from the ultrasonic flaw detector 4 at the time the captured image G used in the calculation process was obtained. In other words, the processing unit 21 relates the sampling data H of the waveform data W received from the ultrasonic flaw detector 4 to the contact rate determined from the captured image G obtained at the same time as this waveform data W. Therefore, the processing unit 21 can select the sampling data H having a high contact rate in the selection process.

The contact rate is an example of "an index indicating the degree of quality" of the present disclosure.

(Second Modification) In the above embodiment or first modification, the display control unit 22 may display the contact rate on the fifth screen 22e as additional information of the waveform data W displayed on the fourth screen 22d.

(Third Modification) In the above embodiment, a case has been described in which as the linking process, the processing unit 21 links one piece of waveform data to one divided area 100a, but the present disclosure is not limited to this, and a plurality of waveform data may be linked thereto. For example, in the above embodiment, first or second modification, when pieces of sampling data H correspond to one divided area 100a as a result of the identification process, the processing unit 21 may execute the linking process to directly or indirectly link the waveform data of the pieces of sampling data H to this divided area 100a. For example, when the sampling data H11 and the sampling data H31 correspond to one divided area 100a (divided area identification number M1) as a result of the identification process, the processing unit 21 links each of the waveform data W1 and the waveform data W3 to this divided area 100a. For example, the processing unit 21 links the divided area identification number M1, the waveform data number S1 of the waveform data W1 that is the original data of the sampling data H11 as tag information, and the waveform data number S3 of the waveform data W3 that is the original data of the sampling data H11 as tag information to each other and stores them in the second table.

Therefore, when the divided area 100a having the divided area identification number M1 is selected by the operation unit 12, the processing unit 21 reads all the tag information (waveform data numbers S1 and S3) linked to the divided area identification number M1 of the selected divided area 100a from the second table. The processing unit 21 may read, from the first table, all of the sampling data (waveform data W1 and W3) related to the waveform data numbers S1 and S3 that are tag information read from the second table and may display them on the fourth screen 22d. In this way, the processing unit 21 may directly or indirectly link the divided area 100a to a plurality of waveform data containing the sampling data H of a plurality of sampling points included in this divided area 100a. When the processing unit 21 executes the linking process with respect to the divided area 100a, only the waveform data of the sampling data H allocated to this divided area 100a is not linked but the original data of all the sampling data H contained in this divided area 100a may be directly or indirectly linked to this divided area 100a.

(Fourth Modification) In the above embodiment, the processing unit 21 executes the selection process when two or more pieces of sampling data H correspond to one divided area 100a, but the present disclosure is not limited to this. For example, in the above embodiment, first or second modification, when two or more pieces of sampling data H correspond to one divided area 100a, the processing unit 21 may calculate a statistic such as an average, a mode and a median of the two or more pieces of sampling data H and may allocate the calculated statistic to this divided area 100*a*. In this case, the processing unit 21 may execute the linking process that directly or indirectly links the divided area 100*a* to which the statistic is allocated and each piece of sampling data H of the two or more pieces of sampling data H contained in this divided area 100*a*

(Fifth Modification) In the above embodiment, the processing unit 21 executes the linking process on each of all the divided areas 100*a,* but the present disclosure is not limited to this, and may execute the linking process on one or more divided area 100*a*. For example, in the above embodiment, first, second, third or fourth modification, when the processing unit 21 executes the linking process on the divided area 100*a,* the processing unit 21 may execute the linking process only on divided areas containing a value (peak value) of the sampling data H greater than a predetermined value.

(Sixth Modification) The ultrasonic flaw detection device A includes one imaging device 3, but the number of imaging devices 3 is not limited, and a plurality of the imaging devices 3 may be provided. For example, the ultrasonic flaw detection device A may include a total of two imaging devices 3 on the front and rear sides of the ultrasonic probe 2 such that the ultrasonic probe 2 is disposed therebetween.

(Seventh Modification) The above imaging device 3 does not include a light-emitting unit provided with a light-emitting element such as an LED but may include a laser oscillator. When the imaging device 3 uses the laser oscillator, a contrast can be increased between a portion where the two-dimensional pattern 1*a* is shown and another portion where the two-dimensional pattern 1*a* is not shown on the sheet material 1 to which a laser beam is emitted.

(Eighth Modification) The above ultrasonic flaw detection device A may include a plurality of ultrasonic probes 2. The ultrasonic probe 2 may be a phased array.

(Ninth Modification) In the above embodiment, the ultrasonic flaw detector 4 samples the waveform data W obtained by the ultrasonic probe 2 at predetermined sampling intervals and outputs pieces of sampling data H to the information-processing device 5, but the present disclosure is not limited to this. For example, the processing unit 21 may sample the waveform data W obtained by the ultrasonic probe 2 at predetermined sampling intervals.

As described above, the ultrasonic flaw detection device A of this embodiment includes the processing unit 21 and the display control unit 22. The processing unit 21 stores pieces of sampling data H obtained by sampling the waveform data W obtained by the ultrasonic probe 2 at predetermined sampling intervals in the storage unit 23 continuously in time series. The display control unit 22 divides the inspection area 100 into a plurality of divided areas 100*a* and displays each of the divided areas 100*a* on the display 11. The processing unit 21 directly or indirectly links one or more divided area 100*a* to one or more waveform data W containing the sampling data H of one or more sampling point included in this divided area 100*a*.

According to the above configuration, the examiner can refer to the waveform data W at a portion (divided area) suspected to have a defect on the display 11 and can grasp the movement of the echo and the movement of the inspection probe. Therefore, it is possible to distinguish whether the echo indicates a defect or a noise and to accurately distinguish defects.

When the examiner uses a conventional manual-type ultrasonic flaw detection device, ultrasonic flaw detection (hereinafter referred to as "manual operation UT") is performed in which the examiner detects a defect while referring to the waveform of echo displayed on the display. In this manual operation UT, the examiner may execute a scan (swing scan) by changing the direction of the inspection probe (ultrasonic probe) while maintaining the position coordinates of the inspection probe to be fixed. In the manual operation UT, the examiner performs a swing scan, refers to a difference in the degree of reflection caused by changing the direction of a beam (ultrasonic waves) with respect to a defect and distinguishes the shape and type of the defect. However, the manual operation UT puts a huge burden on the examiner because the examiner has to refer to the intensity of an ultrasonic echo displayed on the display on site and to record the test results. Accordingly, in the above manual-type ultrasonic flaw detection device, an ultrasonic flaw detection device (hereinafter referred to as "EM-UT") has been proposed in which while the scanning using the ultrasonic probe is manually performed, the intensity (e.g., maximum value) of an ultrasonic echo at each position in the inspection range is recorded. However, the conventional EM-UT records only the intensity (e.g., maximum value) of the ultrasonic echo at each position in the inspection area, the movement of the echo and the movement of the inspection probe cannot be grasped, and thus the echo may not be distinguished to indicate a defect or a noise. In the conventional EM-UT, since the intensity (e.g., maximum value) of the ultrasonic echo at each position in the inspection area is only recorded, the shape and type of the defect may not be distinguished. In the conventional EM-UT, when an equal portion is scanned at a number of times, the echo intensity of the portion may be overwritten, and thus high quality data (echo intensity) may be overwritten by low quality data (echo intensity). Therefore, the examiner has to carefully scan using the probe so as not to overwrite the data.

The ultrasonic flaw detection device A of this embodiment stores pieces of sampling data H obtained by sampling the waveform data obtained by the ultrasonic probe 2 at predetermined sampling intervals in the storage unit 23 continuously in time series, and thus data (waveform data) of swing scan or repeated scan can be recorded. Therefore, the examiner can refer to the waveform data of the swing scan or the repeated scan in a portion (divided area) suspected to have a defect at any time, and it is possible to distinguish the shape and type of the defect. Since the pieces of sampling data H stored in the storage unit 23 continuously in time series are not overwritten, high quality data can be prevented from being overwritten by low quality data. Therefore, it is not necessary to carefully move the probe, and the inspection period of time can be reduced. When the examiner decreases the scanning speed of the probe during repeated scan focusing on defects, the density of the position coordinates at which the waveform is obtained is increased, and the measurement resolution of the defect shape is improved.

The whole or part of the above-described information-processing device 5 may be configured of a computer. In this case, the computer may include a processor such as a CPU and a GPU and a computer-readable recording medium. A program for causing the computer to obtain the whole or part of the functions of the information-processing device 5 may be recorded in the computer-readable recording medium, and the program recorded in the recording medium may be read into the processor and may be executed, thereby obtaining the whole or part of the functions. The "computer-readable recording medium" refers to a portable medium such as a flexible disk, a magneto-optical disk, a ROM or a CD-ROM, or a storage device such as a hard disk provided inside a computer system. The "computer-readable recording medium" may include a medium that dynamically holds a program for a short period of time, such as a communication line for transmitting the program through a network such as the Internet or a telephone line, and a medium that holds a program for a certain period of time, such as a volatile memory inside a computer system serving as a server or a client in that case. The above program may be a program for obtaining part of the above-described functions, may be a program that can obtain the above-described functions in combination with another program recorded in a computer system in advance, or may be a program obtained by using a programmable logic device such as FPGA.

The "computer-readable recording medium" may be a non-temporary computer-readable recording medium.

In the above embodiment, a configuration in which the inspection target is the pipe K has been described, but the present disclosure is not limited to this. The inspection target may be a rod member, a tube member, a plate member or the like made of metal (e.g., weldable metal), a rolled member, a forged member, or a welded portion thereof. Substances such as carbon fiber-reinforced plastic (CFRP), which can be inspected by the ultrasonic flaw detection, may be the inspection target.

INDUSTRIAL APPLICABILITY

The present disclosure can be applied to an ultrasonic flaw detection device that scans an inspection target using an ultrasonic probe to detect flaws in the inspection target.

The invention claimed is:

1. An ultrasonic flaw detection device, comprising:
an ultrasonic probe that detects waveform data of ultrasonic echoes emitted to an inspection area of an inspection target;
at least one memory storing instructions; and
at least one processor configured, by executing the instructions, to:
store pieces of sampling data obtained by sampling the waveform data obtained by the ultrasonic probe at predetermined sampling intervals in the at least one memory or in a second memory continuously in time series,
divide the inspection area into a plurality of divided areas and display each of the plurality of divided areas on a display,
link a divided area of the plurality of divided areas to one or more waveform data containing sampling data of one or more sampling point included in the divided area,
execute an identification process for identifying, for each piece of the sampling data, which divided area of the plurality of divided areas a position of the sampling point corresponds to and link the one or more waveform data containing the sampling data in which the corresponding divided area is identified and the corresponding divided area to each other, and
execute, when two or more pieces of the sampling data correspond to one divided area as a result of the identification process, a selection process for selecting one piece of the sampling data from the two or more pieces of the sampling data and allocate the selected piece of the sampling data through the selection process to the divided area to which the selected piece of the sampling data corresponds.

2. The ultrasonic flaw detection device according to claim 1,
wherein the at least one processor is further configured, by executing the instructions, to read, when receiving instructions for selecting any divided area from the plurality of divided areas, the waveform data linked to the selected divided area and display the read waveform data on the display.

3. The ultrasonic flaw detection device according to claim 1,
wherein the at least one processor is further configured, by executing the instructions, to allocate the sampling data in which the corresponding divided area is identified through the identification process to the corresponding divided area.

4. The ultrasonic flaw detection device according to claim 3,
wherein the at least one processor is further configured, by executing the instructions, to fill the divided area to which the sampling data is allocated with a color according to a value of the sampling data.

5. The ultrasonic flaw detection device according to claim 1, further comprising:
a sheet material attached to a surface of the inspection target and having two-dimensional patterns shown thereon, the two-dimensional patterns being arranged on the inspection target and indicating positions on the inspection target; and
an imaging device attached to the ultrasonic probe to image the two-dimensional patterns,
wherein the at least one processor is further configured, by executing the instructions, to read position information indicating a position on the inspection target from a captured image captured by the imaging device and relate each piece of the sampling data of the waveform data obtained by the ultrasonic probe to the position information read from the captured image obtained at the same time as the waveform data.

6. The ultrasonic flaw detection device according to claim 5,
wherein the at least one processor is further configured, by executing the instructions, to determine an index indicating a degree of quality of the waveform data from the captured image obtained at the same time as the waveform data, relate the determined index to each piece of the sampling data of the waveform data, and when two or more pieces of the sampling data correspond to one divided area as a result of the identification process select the sampling data having the highest index from the two or more pieces of sampling data.

7. The ultrasonic flaw detection device according to claim 5,
wherein in the identification process, the at least one processor is further configured, by executing the instructions, to identify, based on the position information, which divided area of the plurality of divided areas a position of each sampling point of the sampling data related to the position information corresponds to.

* * * * *